July 2, 1935.   J. MIKULASEK   2,007,021
BEARING CONSTRUCTION
Filed Dec. 5, 1932
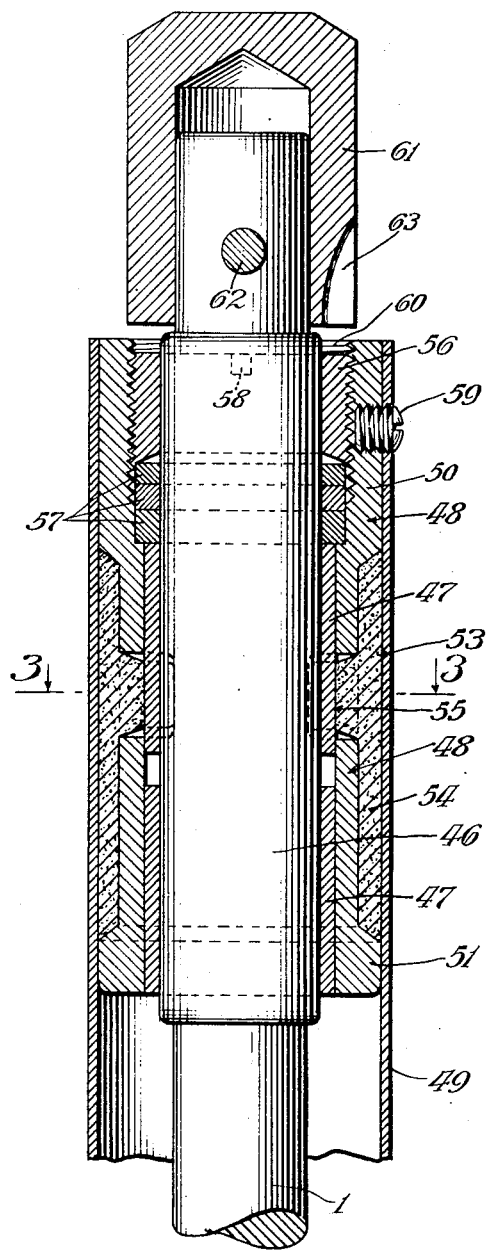
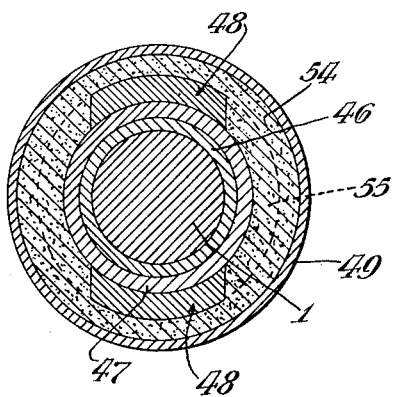
Inventor:
John Mikulasek,
By Parkinson & Lane.
Attorneys Patented July 2, 1935

2,007,021

UNITED STATES PATENT OFFICE 2,007,021

BEARING CONSTRUCTION

John Mikulasek, Newton, Iowa, assignor to The Maytag Company, Newton, Iowa, a corporation of Delaware Application December 5, 1932, Serial No. 645,772

2 Claims. (Cl. 308—139)

The present invention relates to a bearing construction and more in particular to a novel bearing for the upper end of a drive shaft as in the center post of a washing machine.

Among the objects of the invention is to provide a novel bearing construction for journalling the upper portion or end of a drive shaft as for an agitator or impelling means of a washing machine.

A still further object is the provision of a bearing provided with a novel means of lubricating the shaft and journal wearing surfaces. The present invention contemplates the use of porous bushings permitting the lubricant to seep through the walls thereof to the wearing surfaces of the bearing.

Further objects are to provide a construction of maximum simplicity, efficiency, economy and ease of assembly and operation; and such further objects, advantages and capabilities as will later more fully appear and are inherently possessed thereby.

The invention further resides in the combination, construction and arrangements of parts illustrated in the drawing and while there is shown therein a preferred embodiment it is to be understood that the same is susceptible of modification and change, and comprehends other details, arrangements of parts, features and constructions, without departing from the spirit of the invention.

In the drawing:

Fig. 1 is a fragmentary enlarged view in vertical cross section of a drive shaft showing an embodiment of the invention.

Fig. 2 is a view in horizontal cross section taken in a plane represented by the line 3—3 of Fig. 1.

In the drawing is disclosed a form of bearing construction for a drive shaft 1 of the agitator or impeller for a washing machine which is provided with a sleeve 46 adjacent its upper end. This sleeve is preferably formed of some non-corrosive material such as bronze or the like and is attached to the drive shaft in any suitable manner.

Encompassing the sleeve 46 are provided spaced bearing bushings 47 made of a porous composition or material such as bronze or the like, permitting passage of the lubricant. These bushings are pressed into a bearing body 48 which in turn is pressed into the stationary tubular housing or center post 49 by means of the enlarged opposite ends 50 and 51. This bearing body intermediate its ends is reduced to provide an elongated annular cavity 53 between its body and the tubular housing or center post 49 for the reception and retention of a wick or permanent oil-pack 54.

The annular cavity 53 communicates with the porous bushings 47 through spaced openings or cut-out portions 55. The wick 54 is saturated with lubricant or oil to provide a permanent oil-pack for lubricating the bearing surfaces through the openings 55 and porous walls of the bushings. In actual practice, a change of temperature and capillary attraction will induce the lubricant to pass through the walls of the bushings.

Mounted above the bushings and intermediate the upper bushing and a packing gland 56, are provided packing rings 57. This packing gland is provided with spaced tool-slots 58 for permitting a tightening up of the packing when that becomes necessary. As clearly disclosed in Fig. 1, this packing gland is threaded in the enlarged end 50 of the bearing body and is prevented from turning by reason of a set screw 59 mounted in the end 50 and the upper end of the tubular housing or center post 49.

In the construction disclosed, additional lubricant or oil may be applied directly to the journal and packing at 60.

At the upper end of the shaft is keyed or mounted a non-circular driving head or torque-hub 61 as by means of a pin 62 or the like. This head or torque-hub is provided with a slot 63 permitting access to the tool slots 58 for adjusting the packing gland 56.

From the above description and disclosure in the drawing it will be readily apparent that the invention is admirably adapted for use in a washing machine drive, although it is to be understood that the invention is not limited thereto. The invention likewise comprehends other constructions, details, arrangements of parts, and features without departing from the spirit thereof.

Having thus disclosed the invention, I claim:

1. A bearing for a drive shaft having a stationary tubular post in which said shaft rotates, comprising a bearing member connected to said center post, a porous bushing connected to said member and encompassing the shaft, an oil-pack communicating with said bushing, packing encompassing said shaft and seating above said bushing, an adjustable packing gland for adjusting the pressure on said packing, and means for preventing said gland from turning after adjustment has been made.

2. A bearing for a drive shaft having a stationary tubular post in which said shaft rotates, comprising a bearing sleeve mounted on said shaft and rotatable therewith, a bearing member attached to said center post, a porous bushing mounted on said bearing member, an oil-pack positioned intermediate the ends of said bearing member and communicating with the bushing, packing seating on said bushing, and a packing gland adapted to be adjusted relative to said member whereby to adjust the pressure exerted on said last mentioned packing.

JOHN MIKULASEK.